(12) United States Patent
Huang et al.

(10) Patent No.: US 9,591,539 B2
(45) Date of Patent: Mar. 7, 2017

(54) METHOD AND APPARATUS FOR INTERFERENCE CONTROL

(75) Inventors: Min Huang, Beijing (CN); Yongquan Qiang, Beijing (CN); Lei Xiao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/385,222

(22) PCT Filed: Jul. 27, 2012

(86) PCT No.: PCT/CN2012/079269
§ 371 (c)(1),
(2), (4) Date: Sep. 15, 2014

(87) PCT Pub. No.: WO2014/015517
PCT Pub. Date: Jan. 30, 2014

(65) Prior Publication Data
US 2015/0146686 A1    May 28, 2015

(51) Int. Cl.
*H04W 36/20* (2009.01)
*H04W 36/08* (2009.01)
*H04W 36/00* (2009.01)

(52) U.S. Cl.
CPC ....... *H04W 36/20* (2013.01); *H04W 36/0072* (2013.01); *H04W 36/08* (2013.01)

(58) Field of Classification Search
None
See application file for complete search history.

(56) References Cited

U.S. PATENT DOCUMENTS

| 2011/0249642 A1 | 10/2011 | Song et al. |
| 2011/0275394 A1 | 11/2011 | Song et al. |
| 2012/0113843 A1 | 5/2012 | Watfa et al. |

(Continued)

FOREIGN PATENT DOCUMENTS

| CN | 101835168 | 9/2010 |
| CN | 101932140 | 12/2010 |

(Continued)

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 10), 2012.

(Continued)

*Primary Examiner* — Kwang B Yao
*Assistant Examiner* — Adam Duda
(74) *Attorney, Agent, or Firm* — Baker Botts, LLP (57) ABSTRACT

Methods and apparatuses for interference control have been disclosed. A method for a source cell in a handover procedure is provided. The method comprises: determining restricted subframes in which signal transfer from the source cell to its served user equipments is restricted; and notifying information about the determined restricted subframes to a target cell, wherein the determined restricted subframes are used for scheduling user equipments which are taking handover from the source cell to the target cell. Thus, an improved approach has been provided to decrease the dropping rate in cell soft lock for PCI collision.

19 Claims, 7 Drawing Sheets

(56) References Cited

U.S. PATENT DOCUMENTS

2013/0084865 A1* 4/2013 Agrawal .......... H04W 36/0083
455/436

FOREIGN PATENT DOCUMENTS

| CN | 102014417 | 4/2011 |
|---|---|---|
| CN | 102106177 | 6/2011 |
| CN | 102595533 | 7/2012 |

OTHER PUBLICATIONS

PCT Notification of Transmittal of International Preliminary Report on Patentability with attached Response to Written Opinion under Article 34 in International Application No. PCT/CN2012/079269, dated Mar. 11, 2015, 19 pages.

PCT Notification of Transmittal of the International Search Report and the Written Opinion of the International Searching Authority, or the Declaration for International application No. PCT/CN2012/079269, May 2, 2013.

PCT Demand; Chapter II; International application No. PCT/CN2012/079269, Jul. 24, 2013.

* cited by examiner

(a) FDD frame structure (b) TDD frame structure

METHOD AND APPARATUS FOR INTERFERENCE CONTROL

PRIORITY

This nonprovisional application is a U.S. National Stage Filing under 35 U.S.C. §371 of International Patent Application Serial No. PCT/CN2012/079269, filed Jul. 27, 2012 and entitled "Method and Apparatus for Interference Control."

FIELD OF THE INVENTION

Embodiments of the present invention generally relates to communication systems, and more particularly to a method, an apparatus, a base station, and a computer program for interference control in a handover procedure.

BACKGROUND OF THE INVENTION

This section introduces aspects that may help facilitate a better understanding of the invention(s). Accordingly, the statements of this section are to be read in this light and are not to be understood as admissions about what is in the prior art or what is not in the prior art.

The abbreviations and terms appearing in the description and drawings are defined as below.
3GPP Third Generation Partnership Project
ABS Almost Blank Subframe
BS Base Station
CBS Complete Blank Subframe
CDMA Code Division Multiple Address
CRS Common Reference Signal
DL Downlink
DMRS Demodulation Reference Signal
eICIC Enhanced inter-cell interference coordination
eNB enhanced NodeB, Base Station in E-UTRAN
E-UTRAN Evolved UTRAN
FDD Frequency Division Duplex
HO HandOver
IE Information Element
LTE Long Term Evolution
LTE-A Long Term Evolution-Advanced
PCI Physical Cell Identifier
PDCCH Physical Downlink Control Channel
PDSCH Physical Downlink Shared Channel
PHICH Physical HARQ Indicator Channel
PSS Primary Synchronization Signal
RRC Radio Resource Control
RS Reference Signal
RSRP Reference Symbol received power
SON Self-optimization network
SSS Secondary Synchronization Signal
TDD Time Division Duplex
UE User Equipment
UL Uplink
UTRAN Universal Terrestrial Radio Access Network According to LTE specification, each cell in an LTE network is configured with a physical cell identifier (PCI), which determines the physical channel configuration in this cell, including downlink and uplink physical control channels and data channels, as well as a variety of reference signals and synchronization signals. Therefore, in LTE network deployment and network optimization, some rules are given to configure the PCI values for a group of neighbour cells. One important rule is to avoid "PCI collision" in which two neighbour cells have the same PCI values.

However, in practice, quite many factors could lead to the occurrence of a PCI collision, such as the fault in network dimensioning, neighbour cell relation change due to the radio propagation environment variation, the side effect or fault in PCI optimization (a kind of regular self-optimization network (SON) operation), and the employment of heterogeneous network (like pico-cell, femto, relay cell) etc. Once a PCI collision is spotted, the PCI reconfiguration for at least one of the relevant cells should be executed. Because the PCI determines the basic physical layer parameters, its reconfiguration usually needs to shut down the cell and then assign another suitable PCI value off-line. During this procedure, user equipments (UEs) served by this cell should be moved outward to neighbour cells as much as possible. The approach is to set a certain time period in which the UEs served by this cell are assisted to move outward, by either handover or release with redirection. This procedure is called as "cell soft-lock", which belongs to one function of self-optimization network (SON), as shown in FIG. 1.

Figure 1:
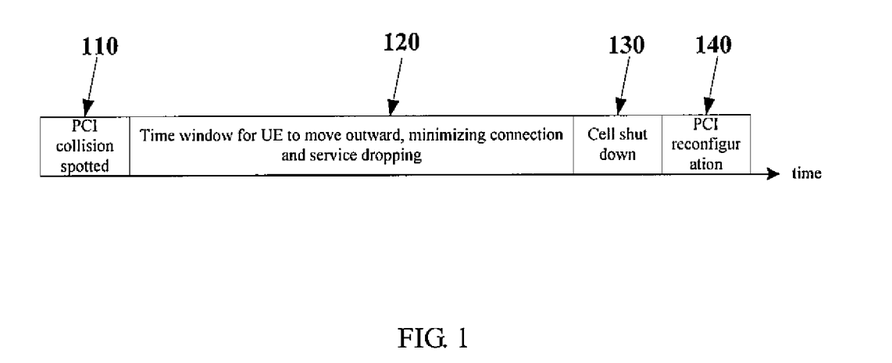
FIG. 1 illustrates the process of cell soft-lock upon PCI collision.

FIG. 1 shows the process of cell soft-lock upon PCI collision. As shown in FIG. 1, at the time 110, a PCI collision is spotted. Then, a time window 120 is set for the UEs to move out of the cell. During this process, connection and service dropping should be minimized. After this, at the time 130, the cell is shut down. Then, the PCI reconfiguration may be executed during the period 140.

To guarantee the user experience, minimizing the dropping rate is one important object in the cell soft-lock procedure. However, for those UEs which lie in the border of two cells with identical PCI value (i.e., PCI collision), it becomes very difficult for them to take handover from one cell to another, because the identical PCI makes the physical layer control channels as well as the data channels in these two cells collide with each other.

SUMMARY OF THE INVENTION

Therefore, it would be desirable in the art to provide solutions for controlling strong interference such as being caused by PCI collision. It would also be desirable to provide a method by which UEs in a soft-lock cell can take handover to a neighbor cell with the identical PCI, while minimizing connection and service dropping.

To better address one or more of the above concerns, in a first aspect of the invention, a method for a source cell in a handover procedure is provided. The method comprises: determining restricted subframes in which signal transfer from the source cell to its served user equipments is restricted; and notifying information about the determined restricted subframes to a target cell, the determined restricted subframes being used for scheduling user equipments which are taking handover from the source cell to the target cell.

In some embodiments, there is physical cell identifier (PCI) collision between the source cell and the target cell.

In some embodiments, the handover is triggered by a cell soft-lock procedure.

In some embodiments, in the restricted subframes, transmission of a common reference signal (CRS) is eliminated.

In further embodiments, in the restricted subframes, transmission of a primary and/or secondary synchronization signal is restricted.

In some embodiments, the number of restricted subframes is increased with the decrease of the number of user equipments served by the source cell.

In some embodiments, the method may further comprise transmitting the information about the determined restricted subframes to partial or all user equipments served by the source cell.

In a second aspect of the invention, a method for a target cell in a handover procedure is provided. The method may comprises: receiving, from a source cell, information about restricted subframes in which signal transfer from the source cell to its served user equipments is restricted; and scheduling user equipments which are taking handover from the source cell in the restricted subframes.

In a third aspect of the invention, an apparatus is provided to implement various embodiments of the method of the first aspect of the invention. Specifically, an apparatus for a source cell in a handover procedure is provided. The apparatus may comprise a determining unit, configured to determine restricted subframes in which signal transfer from the source cell to its served user equipments is restricted; and a notifying unit, configured to notify information about the determined restricted subframes to a target cell, the determined restricted subframes being used for scheduling user equipments which are taking handover from the source cell to the target cell.

In a fourth aspect of the invention, an apparatus is provided to implement various embodiments of the method of the second aspect of the invention. Specifically, an apparatus for a target cell in a handover procedure is provided. The apparatus may comprise a receiving unit configured to receive, from a source cell, information about restricted subframes in which signal transfer from the source cell to its served user equipments is restricted; and a scheduling unit configured to schedule user equipments which are taking handover from the source cell in the restricted subframes.

In a fifth aspect of the invention, an apparatus is provided, which comprises at least one processor and at least one memory including computer program code. The memory and the computer program code are configured to cause the apparatus to perform embodiments of the method of the first aspect of the invention and/or embodiments of the method of the second aspect of the invention.

In a sixth aspect of the invention, a computer program product is provided, which, comprises at least one computer readable storage medium having a computer readable program code portion stored thereon. The computer readable program code portion comprises program code instructions for perform embodiments of the method of the first aspect of the invention and/or embodiments of the method of the second aspect of the invention.

In a seventh aspect of the invention, an apparatus is provided, which comprises means for implementing each step of the method of the first aspect of the invention and/or each step of the method of the second aspect of the invention.

Particular embodiments of the subject matter described in this specification can be implemented so as to realize one or more of the following advantages.

With particular embodiments of the techniques described in this specification, strong interference for example due to PCI collision may be controlled by configuring restricted subframes. Such interference control method may be applied in a handover procedure, so as to minimizing the dropping rate of connection and service during the handover procedure.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION OF EMBODIMENTS

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As mentioned previously, in the cell soft-lock procedure for PCI collision scenarios, it is required that the served UEs in the cell should be moved outward to neighbor cells. In this process the connection and service of these UEs should be prohibited from being dropped as much as possible.

In fact, this requirements is not easy to be satisfied in usual manner, because the PCI collision makes the two relevant cells share some important physical layer parameters. Therein, common Reference Signal (CRS) in downlink depends on the cell PCI value, in the way that the CRS frequency location and CRS sequence are calculated directly by the PCI value. Thus, if two cells have the same PCI, their CRS are colliding, both with respect to the frequency location and the CRS sequence. Primary and Secondary Synchronization Signal (PSS/SSS) also depends on the cell PCI value, in the way that the PSS and SSS sequences are calculated directly by the PCI value. Some other physical channels, like physical random access channel (PRACH), and physical layer reference signals, like demodulation reference signal (DMRS), are also influenced by PCI value. Therefore, in the two cells with PCI collision, a UE at the border of these two cells may suffer from great interference and confusion in downlink signal reception and uplink signal transmission.

Figure 2:
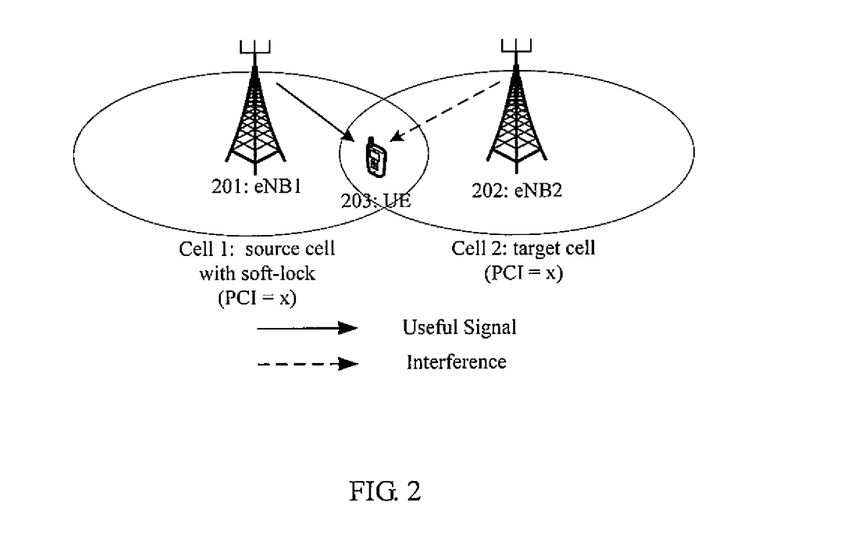
FIG. 2 illustrates an example of a PCI collision scenario.

FIG. 2 illustrates an example of a PCI collision scenario. As shown in FIG. 2, a PCI collision exists between a cell 1 which is controlled by an eNB1 201 and a cell 2 which is controlled by an eNB2 202. Some UEs (e.g., a UE 203 as shown) served by the cell 1 might locate at the border of these two PCI-collision cells. FIG. 2 has shown an exemplary scenario where the downlink transfer of the eNB2 will interfere with the downlink transfer from the eNB1 to the UE 203.

In the beginning, the UE 203 which locates at the border of two PCI-collision cells is served by the cell 1, in which the downlink signal strength is higher than that from the cell 2 and hence this UE 203 can maintain its connection with the cell 1. Then, the cell 1 is spotted as PCI-collision with the cell 2, and is determined to execute soft lock. Through the measurement report by this UE 203, the eNB1 201 can be aware that this UE 203 cannot reach the coverage of other cells with different PCI, though it might not know whether this UE 203 is at the border with the cell 2.

The only possible endeavor to continue the connection for this UE 203 is to let it take handover to the cell 2. The handover can follow the usual procedure as regulated in 3GPP specification. Then, because this UE 203 cannot distinguish the Common Reference Signal (CRS) from these two cells, and hence it suffers from severe channel estimation error and is unable to decode the downlink data transfer from the cell 2, and therefore would fail in the step of receiving message 2 in a random access procedure. Message 2 is also called as random access response, which is fed back from an eNB to a UE and comprises sequence ID, timing advance (TA), resource allocation, etc. When this UE 203 is more close to the eNB1 201, it is more difficult to receive message 2 from the eNB2 202.

A kind of interference control technique, i.e., enhanced inter-cell interference coordination (eICIC), is introduced into 3GPP standard Rel-10. The basic idea is to configure timing differentiation in signal transfer between two mutual-interfered cells, including the scenario with a macro cell and a pico cell and the scenario with a macro cell and a femto cell. To serve this purpose, a kind of subframe is proposed in which reduced power on some physical channels and/or reduced activity is regulated, including the reduction of the control channel, data channel and reference signal. Such subframe is called as Almost Blank Subframe (ABS). The configuration of ABS can be informed among eNBs via X2 interface.

However, usually the two neighbor cells have different PCI values, and there is no special regulation for ABS to handle a PCI collision in prior art. In the usual case, the physical layer configuration collision is not as severe as PCI collision, so that common Reference Signal (CRS) can be retained in ABS, but for cells with PCI collision, the CRS collision would strongly influence the downlink receiving at a UE.

Besides, the target cell usually fully overlaps with the source cell, so that all the UEs in the target cell are scheduled in ABS, whereas in the scenarios of the present invention, the target cell is usually not fully overlapped with the source cell, and thus the UEs which take handover from a soft-lock cell should have higher priority to be scheduled.

Figure 3:
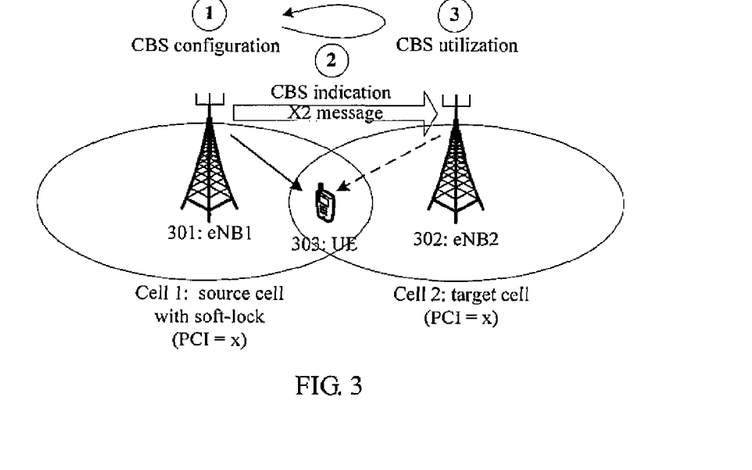
FIG. 3 illustrates a general solution and its exemplary application scenario according of the present invention.

FIG. 3 illustrates a general solution and its exemplary application scenario according of the present invention. Similar to the scenario shown in FIG. 2, it involves a handover procedure triggered by a cell soft-lock procedure for PCI collision. However, the skilled in the art should appreciate that embodiments of the present invention may be applied in various scenarios where strong inter-cell interference such as caused by PCI collision would occur.

In the following description, for brevity and convenience, a term "Complete Blank Subframe (CBS)" is introduced. CBS means restricted subframes in which signal transfer from a cell in question to its served UEs is restricted. Particularly, in the CBS, downlink data transfers are completely muted. Additionally, in the CBS, transmission of a common Reference Signal (CRS) is completely eliminated. Optionally, if a Primary and/or Secondary Synchronization Signal (PSS and/or SSS) exists in the CBS, transmission of the PSS and/or SSS may be restricted, including reducing its transmission power or eliminating its transmission completely. Further, in the CBS, transmission of other physical layer parameters, e.g., demodulation reference signal (DMRS), may be restricted.

As shown in FIG. 3, a PCI collision exists between a cell 1 which is controlled by an eNB1 301 and a cell 2 which is controlled by an eNB2 302. Some UEs (e.g., a UE 303 as shown) served by the cell 1 might locate at the border of these two PCI-collision cells. The downlink transfer of the eNB2 will interfere with the downlink transfer from the eNB1 to the UE 203, and vice versa.

Embodiments of the present invention may involve applying an cyclic mode in a soft-lock related handover procedure, which includes three steps (as shown in FIG. 3): configuring a portion of subframes as CBS at the source cell 1 with soft-lock; indicating information about the CBS from the source cell 1 to the target cell 2; and utilizing the indicated CBS at the target cell with PCI collision, with preference of signal transfer to UEs which are taking handover from the soft-lock source cell 1. The number of CBS may be dynamically and gradually increased in cycles with the decrease of the number of UEs served by the source cell 1.

With embodiments of the present invention, strong interference between a source cell and a target cell for example due to PCI collision may be controlled by configuring CBS. Further, an approach is provided to decrease the dropping rate in a cell soft-lock procedure for PCI collision, for those UEs which locate at the border of the two PCI-collision cells. The proposed approach follows the existing handover rule, and thus it can be generally utilized in practical systems. Moreover, the radio access technology (RAT) network is not limited to LTE. In fact, the proposed approach can be used in any cellular network.

In the following description, the proposed mechanism will be detailed with respect to exemplary embodiments illustrated in the drawings.

Figure 4:
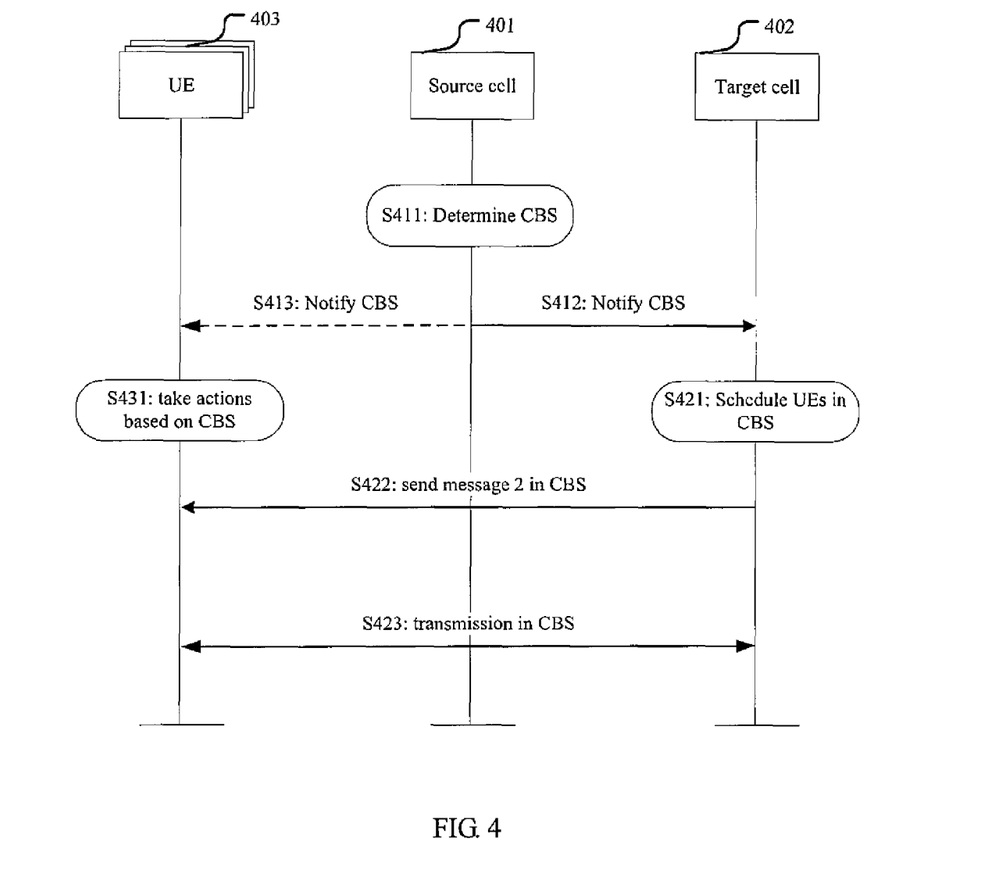
FIG. 4 illustrates an exemplary signal flow according to embodiments of the present invention.

FIG. 4 illustrates an exemplary signal flow according to embodiments of the present invention.

As shown in FIG. 4, at step S411, the soft-lock source cell 401 determines which subframes are to be configured as CBS.

CBS means restricted subframes in which signal transfer from a cell in question to its served UEs is restricted. As mentioned above, in the CBS, downlink data transfers are completely muted and part of control channel or symbols are restricted.

Specifically, in the CBS, transmission of a common Reference Signal (CRS) is completely eliminated. This is critical for PCI collision scenario where the PCI values are the same in the two neighboring cells, because UEs would use the CRS to determine the PCI.

Optionally, if a Primary Synchronization Signal and/or a Secondary Synchronization Signal (PSS and/or SSS) exist in the CBS, transmission of the PSS and/or SSS may be restricted, including reducing its transmission power or eliminating its transmission completely. In fact, the PSS and the SSS can only appear in subframe 0 and 5 in an FDD frame structure and in subframes 0, 1, 5, and 6 in a TDD frame structure. Generally, in a TDD system, the PSS and the SSS are in different subframes, whereas in a FDD system, the PSS and the SSS are in a same subframe. Thus, a rule for determining CBS is to avoid the collision with the PSS and/or the SSS.

In some embodiments, since no DL data transmission is scheduled in the CBS, physical downlink control channel (PDCCH) transmission for this purpose can be avoided. Meanwhile, the PDCCH transmission for other purpose, like UL data schedule or UL power control, should also be restricted if possible.

In some further embodiments, the physical H-ARQ indicator channel (PHICH) transmission in the CBS may be restricted. The PHICH transmission is due to the previous UL data transfer with strict time regulation. So to restrict the PHICH transmission in the CBS, the corresponding UL data transfer should also be restricted. Besides, the PHICH transmission can also choose to be muted even though the corresponding UL data transmission exists. This way, discontinuous transmission (DTX) would be acknowledged by the UE and the retransmission would be applied for UL data.

Further, in the CBS, transmission of other physical layer parameters, e.g., demodulation reference signal (DMRS), may be restricted, and other downlink activities, like system information broadcast in the physical broadcast channel (PBCH) may be eliminated or avoided.

In addition to the rule of avoiding the collision with the PSS and/or the SSS, other rules may be used to determine the CBS, for example, selecting periodically with a fixed interval, following a certain fixed-length pattern and repeating, or avoiding the collision with the physical broadcast channel (PBCH).

The CBS may comprise downlink subframes and optional uplink subframes. In the uplink subframe of the CBS, uplink transmission is avoided in the soft-lock cell as much as possible. In one implementation, data and control transmission in the physical uplink shared channel (PUSCH), including the new data transmission and adaptive/non-adaptive retransmission, may be restricted. In another implementation, control signaling in the physical uplink control channel (PUCCH) may be restricted.

When the CBS comprises one or more uplink subframes, those periodic activities, like periodic CSI feedback, may be configured to avoid collision with such CBS. Additionally or alternatively, periodic sounding reference signal (SRS) may be configured to avoid collision with the CBS.

Examples of CBS at the source cell and the target cell have been shown in FIG. 5, which will be described later.

Figure 6:
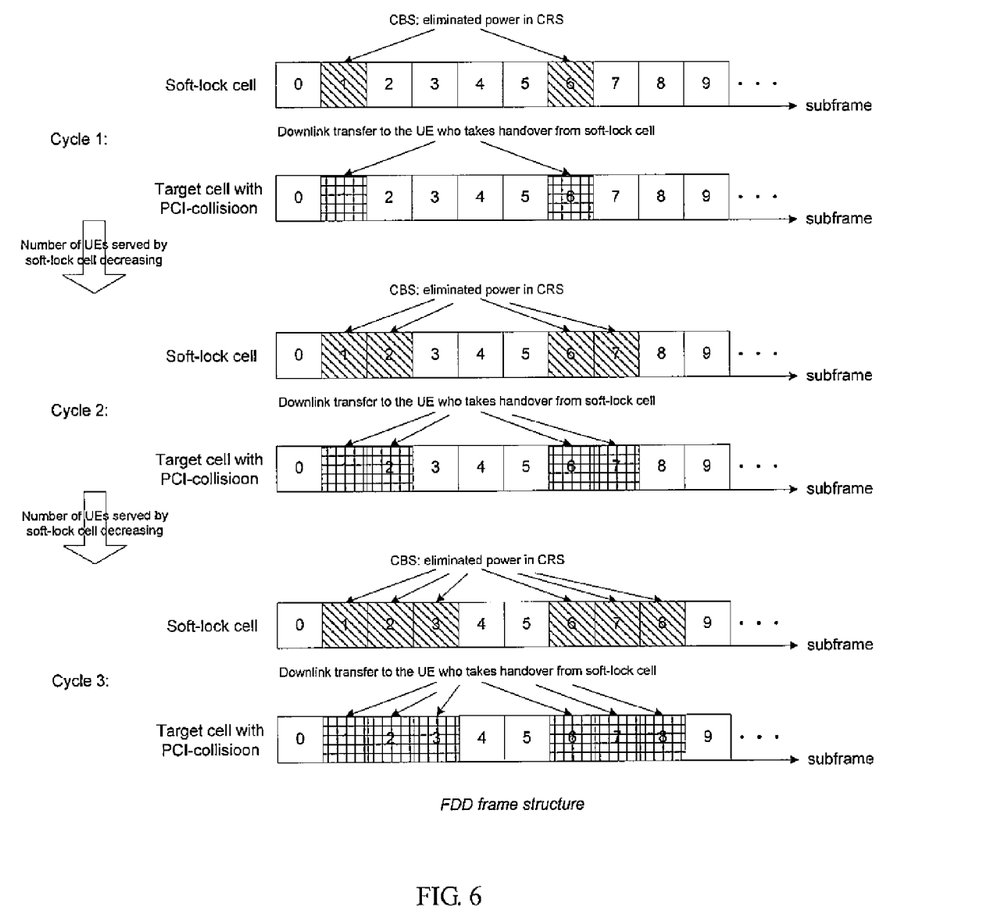
FIG. 6 illustrates the cyclic process with the number of served UEs in the source cell decreasing according to embodiments of the present invention.

In some embodiments, the number of CBS and the configuration wherein can be adaptive to the number of UEs served by the soft-lock source cell 401. With the progress of soft lock, since no UEs are allowed to access inward and increasing number of UEs are made handover outward, the number of the UEs served by the soft-lock cell 401 tends to decrease. In this case, more subframes may be selected as CBS, and further restriction of physical layer activities therein can be made. An example of the adaption of the number of CBS is shown in FIG. 6, which will be described in detail later.

Going on with FIG. 4, at step S412, the source cell 401 may notify information about the configured CBS to the target cell 402. The information may be sent via X2 interface between the eNB that controls the source cell 401 and the eNB that controls the target cell 402.

In one embodiment, the information about the CBS may be sent by reusing the existing information element "ABS information" in "Load information" which is specified in 3GPP specification, TS 36.423 v10.5.0. The currently defined "ABS information" IE can basically satisfy the basic requirement of CBS information notification from the soft-lock cell 401 to the target cell 402. Preferably, one more indicator may be added to indicate that the purpose of the CBS is for the cell soft-lock procedure for PCI collision. Such explicit indication may help the target cell to avoid confusion. Then, the target cell 402 may be aware of treating the UEs coming from the soft-lock cell especially in the CBS.

Nevertheless, the target cell 402 can implicitly know the purpose of the "ABS information" IE. For example, the target cell 402 may learn about the neighbor cell 401 with colliding PCI either via X2 setup signaling or via measurement reports by UE. Therefore, the target cell 402 may already know that the neighbor cell 401 with colliding PCI will be soft-locked and that the notified CBS in "ABS information" IE is used for prioritizing the scheduling of UEs which are taking handover from such cell, if there is a need to prioritize them.

Alternatively, the above additional indicator may be implemented in other information elements, such as by using a cause value "Time critical handover" for handovers of all UEs from the soft-lock cell. This cause value would prioritize those UEs over other UEs in the CBS.

In another embodiment, a new information element may be created and dedicated for notifying the information about the CBS. In this way, no additional indicator is needed.

The information about the CBS may comprise the CBS pattern. Optionally, the information about the CBS may comprise some additional information about the soft-lock operation and the CBS configuration, in order to assist the operation at the target cell. The additional information may be, for example, the time window for UE moving outward and/or the CBS physical layer configuration. The target cell 401 may handle the UEs taking handover from the soft-lock cell more properly according to the additional information.

Then, at step S421, upon receiving the information about the CBS, the target cell 402 schedules the UEs which are taking handover from the soft-lock source cell 401 in the CBS. At the same time, the scheduling to other UEs should be avoided in the CBS as much as possible. In other words, the UEs taking handover from the soft-lock source cell 401 is prioritized in scheduling in the CBS. This is different from the usual ABS utilization, in which all the UEs in the target cell are scheduled in the ABS.

The target cell 402 can easily distinguish those UEs coming from the soft-lock source cell from other UEs. During the usual handover procedure, in the preparation stage, the source cell would exchange information with the target cell, so that the target cell could allocate a dedicated preamble and a given C-RNTI value to the UE in handover. In this way, when the UE takes handover in the target cell, it can be recognized as being from the source cell with PCI collision. Of course, other UEs can also be scheduled in the CBS if there are enough resources for all UEs.

The target cell 402 can schedule the UEs during and/or after the handover procedure. Depending on the configuration of the CBS, downlink transmission from the target cell 402 and optional uplink transmission may be scheduled in the CBS.

In some embodiments, at step S422, during the handover procedure, Message 2 (i.e., the random access response) in the random access process is scheduled in the notified CBS at the target cell 402. Message 2 may comprise sequence ID, timing advance (TA), resource allocation, etc.

In some further embodiments, at step S423, after the handover procedure, the CBS may also be used for the downlink transmission, including control signaling and service data, to the UEs which take handover from the soft-lock source cell 401 until the soft-lock cell 401 is shut down.

As mentioned previously, the CBS may further comprise uplink subframes. In such CBS, the soft-lock source cell 401 avoids scheduling uplink transmission, and the target cell 402 prioritizes in the CBS the scheduling of the UEs which take handover from the soft-lock source cell 401, for example as indicated by step S423 in FIG. 4.

If the length (i.e., the time window) of the soft lock procedure is known by the target cell 402, as described with respect to the step S412, such information may be used by the target cell 402 to determine when to stop utilization of the CBS.

Proceeding with FIG. 4, optionally, at step S413, the soft-lock source cell 401 may notify the information about the CBS to part or all of its served user equipments.

Because the transmission of a common reference signal (CRS) is eliminated in the CBS, it implies that legacy UEs (e.g., Rel-8/9 UEs) will not be able to be served on the CBS. Thus, depending on the UE's capability of coping with CBS configuration, the soft-lock source cell 401 may notify only those UEs which can be served on the CBS.

The notification may be implemented via a system information update procedure or via a RRC signaling. For example, the source cell 401 can change the system information and inform its UEs by paging messages.

Then, at step S431, upon receiving the information of the CBS, the UEs can take actions accordingly. As noted above, this operation can only take effect on Rel-10 UE, so to Rel-8/9 UE, it is invalid.

For example, the UE can avoid using these subframes for DL and UL signaling and data transfer. Such action may slow down the DL and UL data transfer. However, since no more service other than mobility relevant RRC signaling is executed at the soft-lock cell 401, the decreased data transfer throughput in the soft-lock cell 401 is allowable.

As another example, the UE can apply proper algorithm in calculating reference symbol received power (RSRP) for measurement. For a Rel-10 UE, since the CBS information is informed to the UE via a system information update procedure or via a RRC signaling, the UE can be aware of the physical layer configuration change in the CBS and take suitable actions accordingly. For example, the UE can calculate the RSRP by noticing the zero power of the CRS in the CBS. Conversely, for Rel-8 and Rel-9 UEs, since the CBS information is not informed to the UEs, the RSRP measurement result by the UE could be smaller than its actual value, which would trigger handover outward in advance. However, the handover outward is just the intention of the soft-lock cell, and thus such impacted handover behavior is allowable.

Figure 5:
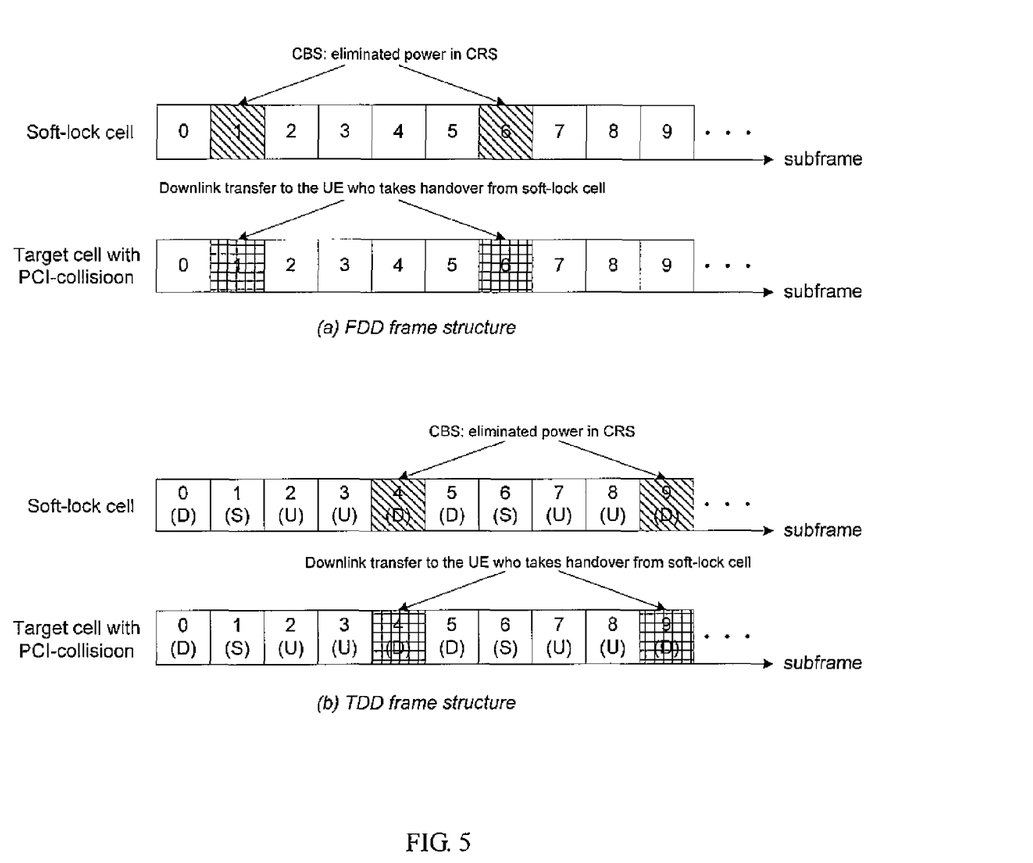
FIG. 5 illustrates examples of restricted subframes at the source cell and the target cell according to embodiments of the present invention.

FIG. 5 illustrates examples of restricted subframes at the source cell and the target cell according to embodiments of the present invention.

As shown in FIG. 5, the upper part (a) shows an FDD frame structure, and the lower part (b) shows a TDD frame structure. As indicated in the part (a), at the soft-lock source cell, subframe 1 and subframe 6 in every frame in the FDD frame structure are selected as CBS, while in the part (b), subframe 4 and subframe 9 in every frame in the TDD frame structure are selected as CBS. In the TDD frame structure, "D" represents downlink subframe, "U" represents uplink subframe, and "S" represents special subframe. The special subframes consist of three fields: Downlink Pilot Time Slot (DwPTS), Guard Period (GP), and Uplink Pilot Time Slot (UpPTS).

As described previously, the exemplary selection of CBS can avoid collision with PSS and/or SSS. Alternatively or additionally, the selection can follow the periodic pattern of 40 subframes in a FDD system or 70 subframes in a TDD system, according to the regulated "ABS information" in 3GPP specification, TS 36.423 v10.5.0.

In these selected CBS, no DL data transmission is scheduled. Further, in the CBS, the transmission of a CRS is eliminated. Additionally, in the CBS, transmission of other physical layer parameters, e.g., DMRS, system information broadcast in the PBCH may be restricted.

Then, at the target cell with PCI collision, upon receiving the information about the CBS, it can schedule in the CBS downlink transmission to the UEs which are taking handover from the soft-lock source cell.

Although FIG. 5 shows an example of CBS for downlink subframes, the skilled in the art can easily extend the same concept to uplink subframes in view of the teaching disclosed herein. In one or more uplink subframes configured as CBS, the soft-lock source cell avoids scheduling uplink transmission, and the target cell prioritizes in the CBS the scheduling of the UEs which take handover from the soft-lock source cell 401.

In some embodiments, the number of CBS may be dynamically and gradually increased in cycles with the decrease of the number of UEs served by the soft-lock source cell. FIG. 6 illustrates the cyclic process with the number of served UEs in the source cell decreasing according to embodiments of the present invention.

FIG. 6 takes an FDD frame structure as an example and has shown three cycles. In Cycle 1, at the soft-lock cell, subframe 1 and subframe 6 in every frame in the FDD frame structure are selected as CBS. That is, 20% of the frame is selected as CBS. Then, at the target cell, upon receiving information about the selected CBS, it can schedule in the CBS downlink transmission to the UEs which are taking handover from the soft-lock source cell.

In Cycle 2, subframes 1, 2, 6, and 7 in every frame in the FDD frame structure are selected as CBS. That is, 40% of the frame is selected as CBS. Then, at the target cell, upon receiving information about the new selected CBS, it can schedule in the CBS downlink transmission to the UEs which are taking handover from the soft-lock source cell.

In Cycle 3, subframes 1, 2, 3, 6, 7, and 8 in every frame in the FDD frame structure are selected as CBS. That is, 60% of the frame are selected as CBS. Then, at the target cell, upon receiving information about the new selected CBS, it can schedule in the CBS downlink transmission to the UEs which are taking handover from the soft-lock source cell.

From the above, it can be seen that the proportion of CBS increases in cyclic process, together with the number of UEs served by the soft-lock cell decreasing.

In one embodiment, a new cycle, i.e, configuring or determining CBS, starts periodically. In another embodiment, a new cycle is triggered by the change of the number of UEs served by the soft-lock cell, for example, once the number of UEs served by the soft-lock cell decreases with a certain amount. Similarly, the notification of the information about the CBS may be either periodically performed or triggered by the adjustment of CBS configuration at the soft-lock cell. The number of cycles depends on the number of original served UEs at the soft-lock cell. In one embodiment, the more the original served UEs are, the more cycles are applied with a smaller CBS proportion increase step.

Figure 7:
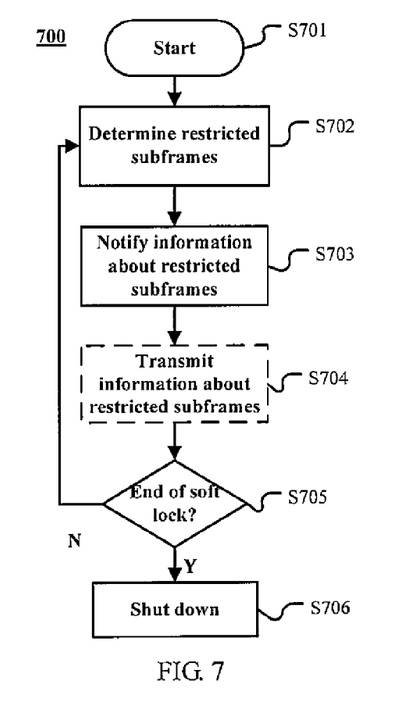
FIG. 7 illustrates an exemplary flowchart of a method 700 according to one aspect of the present invention.

FIG. 7 illustrates an exemplary flowchart of a method 700 performed at a source cell according to one aspect of the present invention. The method 700 may be performed for a base station (e.g., an eNB) serving the source cell in a handover to a target cell. The skilled in the art could understand that, the method 700 may be performed by an entity in the base station, or an entity in the other network element or by multiple entities distributed among various network elements, such as base station, radio network controller (RNC), Media Gateway (MGW), etc.

In some embodiments, there is PCI collision between the source cell and the target cell. In some further embodiments, the handover is triggered by a cell soft lock procedure.

As shown in FIG. 7, the method 700 may begin at the step S701 and proceed to the step S702. At the step S702, the source cell determines restricted subframes (i.e., CBS) in which signal transfer from the source cell to its served UEs is restricted.

In the CBS, transmission of a common reference signal (CRS) is eliminated. Optionally, if a primary synchronization signal and/or a secondary synchronization signal (PSS and/or SSS) exists in the CBS, transmission of the PSS and/or SSS may be restricted, including reducing its transmission power or eliminating its transmission completely. Further, in the CBS, transmission of other physical layer parameters, e.g., DMRS, may be restricted.

The determination of the CBS may be based on various rules, including but not limited to: the number of CBS increasing with the decrease of the number of UEs served by the source cell, avoiding the collision with the PSS and/or SSS, avoiding the collision with PBCH, and/or the likes.

Then, at the step S703, the source cell would notify information about the determined CBS to the target cell, wherein the CBS is used for scheduling UEs which are taking handover from the source cell to the target cell. The notification may be implemented via X2 interface between the eNB that controls the source cell and the eNB that controls the target cell.

In one embodiment, the information about the CBS may be sent by reusing the existing information element "ABS information" in "Load information". Preferably, one more indicator may be added to indicate that the purpose of the CBS is for the cell soft-lock procedure for PCI collision.

In another embodiment, a new information element may be created and dedicated for notifying the information about the CBS. In this way, no additional indicator is needed.

The information about the CBS may comprise the CBS pattern. Optionally, the information about the CBS may comprise some additional information about the soft-lock operation and the CBS configuration, in order to assist the operation at the target cell. The additional information may be, for example, the time window for UE moving outward and/or the CBS physical layer configuration.

The method 700 may proceed to an optional step S704. At the step S704, the source cell may notify the information about the CBS to part or all of its served user equipments. Depending on the UE's capability of coping with CBS configuration, the soft-lock source cell may notify only those UEs which can be served on the CBS.

The notification may be implemented via a system information update procedure or via a RRC signaling.

Then, at the step S705, the source cell determines whether the soft lock is ended. For example, the source cell determines whether the time window for UEs to move outward has been closed. If yes, the method 700 will proceed to the step S706, at which the source cell shuts down.

If no, the method 700 will return to the step S702, at which a new cycle for configuring or determining CBS will start. In one implementation, the new cycle starts periodically. In another embodiment, the new cycle is triggered by the change of the number of UEs served by the soft-lock cell, for example, once the number of UEs served by the soft-lock cell decreases with a certain amount. Similarly, the step S703 and the step S704 of notifying the information about the CBS may be either periodically performed or triggered by the step S702 of determining a new CBS configuration.

Figure 8:
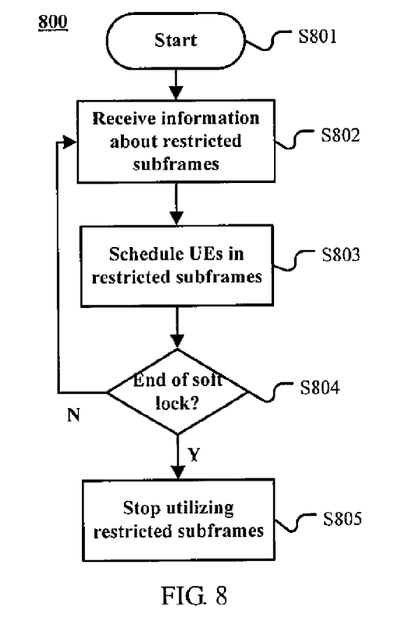
FIG. 8 illustrates an exemplary flowchart of a method 800 according to another aspect of the present invention.

FIG. 8 illustrates an exemplary flowchart of a method 800 performed at a target cell according to one aspect of the present invention. The method 800 may be performed for a base station (e.g., an eNB) serving the target cell in a handover from a source cell to the target cell. The skilled in the art could understand that, the method 800 may be performed by an entity in the base station, or an entity in the other network element or by multiple entities distributed among various network elements, such as base station, radio network controller (RNC), Media Gateway (MGW), etc.

In some embodiments, there is PCI collision between the source cell and the target cell. In some further embodiments, the handover is triggered by a cell soft lock procedure.

As shown in FIG. 8, the method 800 may begin at the step S801 and proceed to the step S802. At the step S802, the target cell receives, from the source cell, information about restricted subframes (i.e., CBS) in which signal transfer from the source cell to its served UEs is restricted.

The information may be received via X2 interface between the eNB that controls the source cell and the eNB that controls the target cell.

In one embodiment, the information about the CBS may be received through the existing information element "ABS information" in "Load information". Preferably, there is one additional indicator in this IE to indicate that the purpose of the CBS is for the cell soft-lock procedure for PCI collision.

In another embodiment, the information about the CBS may be received through a new information element which is created and dedicated for notifying the information about the CBS. In this way, no additional indicator is needed.

The information about the CBS may comprise the CBS pattern. Optionally, the information about the CBS may comprise some additional information about the soft-lock operation and the CBS configuration, in order to assist the operation at the target cell. The additional information may be, for example, the time window for UE moving outward and/or the CBS physical layer configuration.

Then, at the step S803, upon receiving the information about the CBS, the target cell can schedule the UEs which are taking handover from the soft-lock source cell in the CBS. At the same time, the scheduling to other UEs should be avoided in the CBS as much as possible. In other words, the UEs taking handover from the soft-lock source cell is prioritized in scheduling in the CBS.

The target cell can schedule the UEs during and/or after the handover procedure. Depending on the configuration of the CBS, downlink transmission from the target cell and optional uplink transmission may be scheduled in the CBS.

The method 800 in turn goes to the step S804, at which the target cell determines whether the soft lock is ended. For example, if the length (i.e., the time window) of the soft lock procedure is known by the target cell, such information may be used by the target cell to determine when to stop utilization of the CBS.

If yes, then at the step S805, the target cell stops utilizing the CBS. If no, the method returns to the step S802, at which the target cell waits to receive information about a new CBS configuration.

Figure 9:
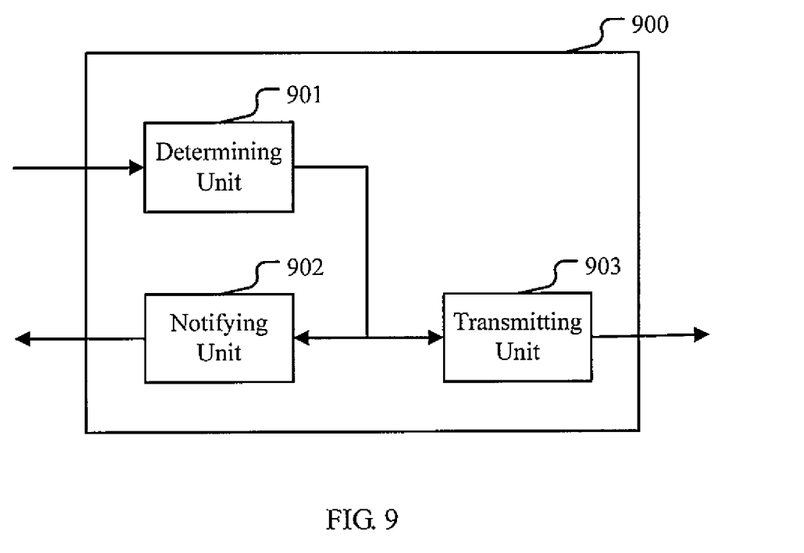
FIG. 9 is a schematic block diagram of an apparatus 900 that may be configured to practice exemplary embodiments according to one aspect of the present invention.

FIG. 9 is a schematic block diagram of an apparatus 900 that may be configured to practice exemplary embodiments according to one aspect of the present invention.

As shown in FIG. 9, the apparatus 900 may comprise a determining unit 901, a notifying unit 902, and a transmitting unit 903. The apparatus 900 may be a base station.

In one aspect, the apparatus 900 may be incorporated in the eNB 401 and be configured to perform methods of the exemplary embodiments of the present invention. Alternatively, the apparatus 900 may be distributed among various network elements, so as to perform the methods of the exemplary embodiments of the present invention.

The determining unit 901 may be configured to determine restricted subframes (i.e., CBS) in which signal transfer from a source cell to its served UEs is restricted.

Reference can be made to the above description with respect to FIGS. 3-6, where the determination of the CBS and the configuration of the CBS have been described in detail, and thus the description thereof is omitted herein.

The notifying unit 902 may be configured to notify information about the determined CBS to the target cell, wherein the CBS is used for scheduling UEs which are taking handover from the source cell to the target cell. The notification may be implemented via X2 interface between the eNB that controls the source cell and the eNB that controls the target cell.

The transmitting unit 903 may be configured to notify the information about the CBS to part or all of the user equipments served by the source cell. Depending on the UE's capability of coping with CBS configuration, the soft-lock source cell may notify only those UEs which can be served on the CBS.

It should be understood, the units 901-903 contained in the apparatus 900 are configured for practicing exemplary embodiments of the present invention. Thus, the operations and features described above with respect to FIGS. 3-7 also apply to the apparatus 900 and the units therein, and the detailed description thereof is omitted here.

Figure 10:
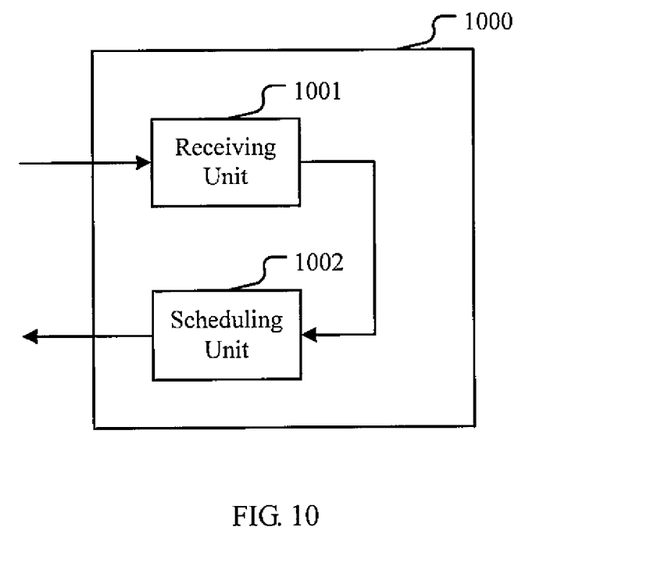
FIG. 10 is a schematic block diagram of an apparatus 1000 that may be configured to practice exemplary embodiments according to another aspect of the present invention.

FIG. 10 is a schematic block diagram of an apparatus 1000 that may be configured to practice exemplary embodiments according to another aspect of the present invention.

As shown in FIG. 10, the apparatus 1000 may comprise a receiving unit 1001 and a scheduling unit 1002. The apparatus 1000 may be incorporated in a BS or eNB and be configured to perform methods of the exemplary embodiments of the present invention. Alternatively, the apparatus 1000 may be distributed among various network elements, so as to perform the methods of the exemplary embodiments of the present invention.

The receiving unit 1001 may be configured to receive, from a source cell, information about restricted subframes (i.e., CBS) in which signal transfer from the source cell to its served user equipments is restricted.

The scheduling unit 1002 may be configured to schedule user equipments which are taking handover from the source cell in the CBS.

It should be understood, the units 1001-1002 contained in the apparatus 1000 are configured for practicing exemplary embodiments of the present invention. Thus, the operations and features described above with respect to FIGS. 3-8 also apply to the apparatus 1000 and the units therein, and the detailed description thereof is omitted here.

Although the apparatus 900 and the apparatus 1000 are illustrated and described separately, they may be contained in a same BS, such that the BS may function as a source BS for controlling a source cell and/or a target BS for controlling a target cell.

Figure 11:
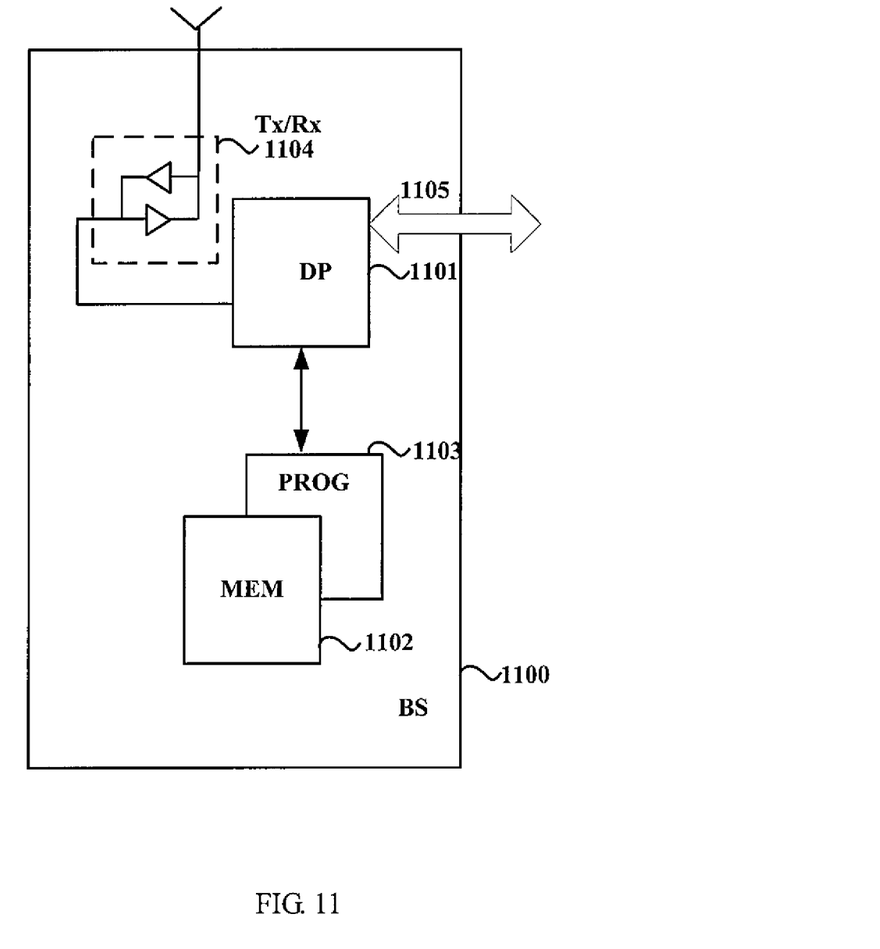
FIG. 11 illustrates a simplified block diagram of a BS 1100 that is suitable for use in practicing exemplary embodiments of the present invention.

FIG. 11 illustrates a simplified block diagram of a BS 1100 that is suitable for use in practicing exemplary embodiments of the present invention.

As shown in FIG. 11, the BS 1100 includes a data processor (DP) 1101, a memory (MEM) 1102 coupled to the DP 1101, a suitable RF transmitter TX and receiver RX 1104 coupled to the DP 1101, and a communication interface 1105 coupled to the DP 1101. The MEM 1102 stores a program (PROG) 1103. The TX/RX 1104 is for bidirectional wireless communications with UEs. Note that the TX/RX 1104 has at least one antenna to facilitate communication, though in practice a BS will typically have several. The communication interface 1105 may be X2 interface for bidirectional communications with other BSs. The BS 1100 may be coupled via a data path to one or more external networks or systems, such as the interne, for example.

The PROG 1103 is assumed to include program instructions that, when executed by the associated DP 1101, enable the BS 1100 to operate in accordance with the exemplary embodiments of this invention, as discussed herein with the methods 700, or 800.

The embodiments of the present invention may be implemented by computer software executable by the DP 1101 of the BS 1100, or by hardware, or by a combination of software and hardware.

The MEM 1102 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the BS 1100, there may be several physically distinct memory units in the BS 1100. The DP 1101 may be of any type suitable to the local technical environment, and may include one or more of general purpose computers, special purpose computers, microprocessors, digital signal processors (DSPs) and processors based on multicore processor architecture, as non limiting examples. The BS 1100 may have multiple processors, such as for example an application specific integrated circuit chip that is slaved in time to a clock which synchronizes the main processor.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method for a source cell in a handover procedure, comprising:
   determining restricted subframes in which signal transfer from the source cell to its served user equipments is restricted; and
   notifying information about the determined restricted subframes to a target cell, the determined restricted subframes being used for scheduling user equipments which are taking handover from the source cell to the target cell;
   wherein a number of restricted subframes is increased with a decrease of a number of user equipments served by the source cell.

2. The method of claim 1, wherein there is physical cell identifier, PCI, collision between the source cell and the target cell.

3. The method of claim 1, wherein the handover is triggered by a cell soft lock procedure.

4. The method of claim 1, wherein in the restricted subframes, transmission of a common reference signal is eliminated.

5. The method of claim 4, wherein in the restricted subframes, transmission of a primary and/or secondary synchronization signal is restricted.

6. The method of claim 1, further comprising:
   transmitting the information about the determined restricted subframes to partial or all user equipments served by the source cell.

7. An apparatus for source cell in a handover procedure, comprising:
   a determining unit, configured to determine restricted subframes in which signal transfer from the source cell to its served user equipments is restricted; and
   a notifying unit, configured to notify information about the determined restricted subframes to a target cell, the determined restricted subframes being used for scheduling user equipments which are taking handover from the source cell to the target cell;
   wherein a number of restricted subframes is increased with a decrease of a number of user equipments served by the source cell.

8. The apparatus of claim 7, wherein there is physical cell identifier, PCI collision between the source cell and the target cell.

9. The method of claim 7, wherein the handover is triggered by a cell soft lock procedure.

10. The apparatus of claim 7, wherein in the restricted subframes, transmission of a common reference signal is eliminated.

11. An apparatus for a target cell in a handover procedure, comprising:
    a receiving unit configured to receive, from a source cell, information about restricted subframes in which signal transfer from the source cell to its served user equipments is restricted; and a scheduling unit configured to schedule user equipments which are taking handover from the source cell in the restricted subframes;

wherein a number of restricted subframes is increased with a decrease of a number of user equipments served by the source cell.

12. The apparatus of claim 11, wherein there is physical cell identifier, PCI collision between the source cell the target cell.

13. The apparatus of claim 11, wherein the handover is triggered by a cell soft lock procedure.

14. The apparatus of claim 11, wherein in the restricted subframes, transmission of a common reference signal from the source cell is eliminated.

15. The apparatus of claim 11 is a base station.

16. A method for a target cell in a handover procedure, comprising:

receiving, from a source cell, information about restricted subframes in which signal transfer from the source cell to its served user equipments is restricted; and scheduling (S603) user equipments which are taking handover from the source cell in the restricted subframes;

wherein a number of restricted subframes is increased with a decrease of a number of user equipments served by the source cell.

17. The method of claim 16, wherein there is physical cell identified, PCI, collision between the source cell and the target cell.

18. The method of claim 16, wherein the handover is triggered by a cell soft lock procedure.

19. The method of claim 16, wherein in the restricted subframes, transmission of a common reference signal from the source cell is eliminated.

* * * * *